Aug. 2, 1949.	H. T. KRAFT	2,477,754
TAIL WHEEL FOR AIRPLANES
Filed Dec. 28, 1944	2 Sheets-Sheet 1

INVENTOR.
Herman T. Kraft
BY
Evans + McCoy
ATTORNEYS

Patented Aug. 2, 1949

2,477,754

UNITED STATES PATENT OFFICE 2,477,754

TAIL WHEEL FOR AIRPLANES

Herman T. Kraft, Akron, Ohio, assignor to The General Tire & Rubber Company, Akron, Ohio, a corporation of Ohio Application December 28, 1944, Serial No. 570,133

3 Claims. (Cl. 152—166)

This invention relates to impact absorbing tail wheels for airplanes and to a pneumatic tire for such wheels.

In landing upon decks of airplane carriers the tail wheels of airplanes are often caused to strike violently against the deck surface when the airplane landing gear is caught by the grapple and such impacts have resulted in much damage to tail wheels and tail wheel tires.

It is an object of the present invention to provide a tail wheel and tail wheel tire that are so constructed that they have superior impact absorbing qualities and which are less subject to damage by such impacts than tail wheels heretofore in use.

It is an object of the invention to provide a landing wheel having a rim with impact shoulders on opposite sides of the tire receiving channel and a pneumatic tire having impact cushioning tread flanges overlying the rim shoulders so that impacts are transmitted first through the pneumatic cushion provided by the tire and then through thick rubber tread flanges to the impact shoulders of the wheel rim.

A further object is to provide a landing wheel tire which is so constructed that the fabric carcass is protected against damage by impact of the tire in landing.

With the above and other objects in view, the invention may be said to comprise the tail wheel and tire as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figures 1, 2, 3:
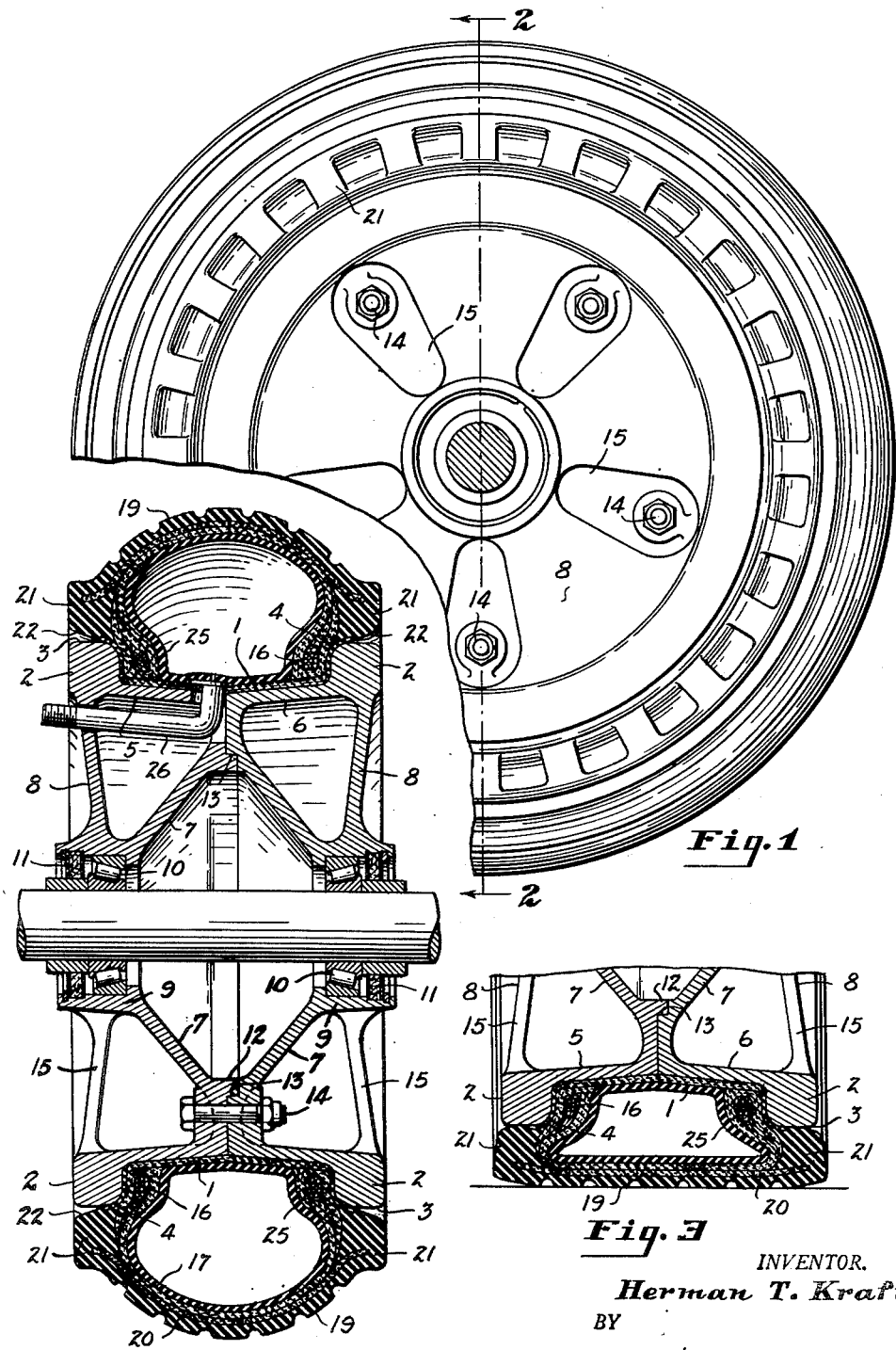
Fig. 1 is a fragmentary side elevation of the tail wheel embodying the invention.
Fig. 2 is an axial section through the wheel taken on the line indicated at 2—2 in Fig. 1.
Fig. 3 is a fragmentary transverse section through the tire and rim, showing the tire collapsed under impact.
Figure 4:
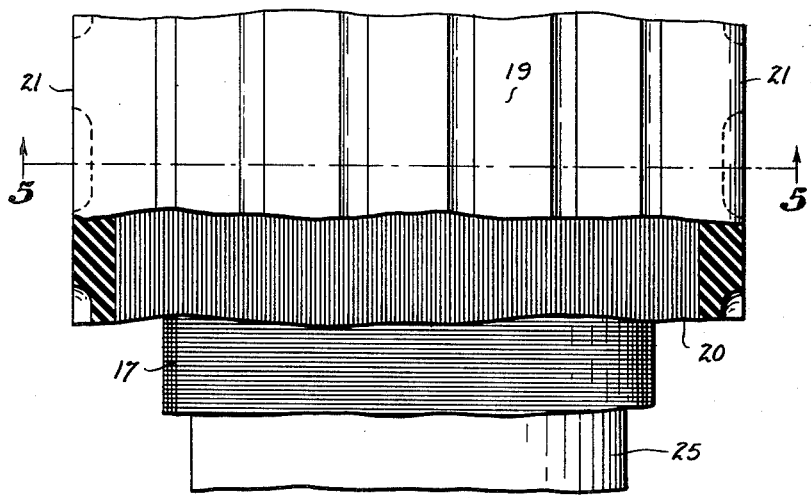
Fig. 4 is a fragmentary plan view showing the tire on an enlarged scale with parts broken away to show the successive layers forming the tread and tire carcass.
Figure 5:
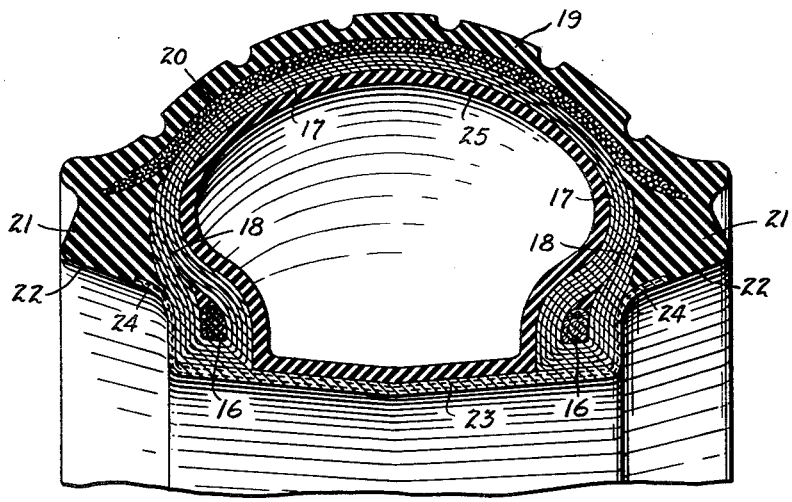
Fig. 5 is a transverse section through the tire taken on the line indicated at 5—5 in Fig. 4.

In the accompanying drawings, a wheel of cast aluminum or magnesium is shown which has a peripheral tire receiving channel 1 and relatively thick impact shoulders 2 on opposite sides of the channel. Each impact shoulder 2 has a peripheral face 3 of cylindrical form and a rounded inner edge 4.

The wheel is composed of two substantially identical sections 5 and 6 which are joined together substantially in the median plane of the wheel. The periphery of each of the sections 5 and 6 forms one-half of the rim and the rim portion of each is connected by inwardly converging conical webs 7 and 8 to a bearing receiving axle portion 9. Each axle portion 9 receives a roller bearing 10 and a grease retaining ring 11. The section 5 has a circular flange 12 projecting laterally from its web 7 and fitting in a circular recess 13 formed in the web 7 of the section 6. Outwardly of the flange 12 and recess 13, the wheel sections abut in the median plane of the wheel and are secured together by means of bolts 14 which are accessible through windows 15 in the webs 8.

The tire of the present invention has a carcass comprising bead rings 16 and superposed plies of cord fabric 17 that have their side edges wrapped around the bead ring 16 and lapping outwardly of the bead rings to form short relatively stiff side wall portions 18. A tread 19 is mounted upon the carcass and this tread is reinforced by superposed layers of cord fabric 20. The tread 19 has a relatively large radius of transverse curvature and projects laterally beyond the side wall portions 18 of the tire carcass, the opposite edge portions of the tread terminating in impact flanges 21 which overlie the side wall portions 18 of the tire carcass and project laterally therefrom. The flanges 21 are relatively thick and have interior conical faces 22 which closely overlie the rounded edges 4 and which are adapted to be forced into full engagement with the cylindrical faces 3 by radial pressure due to impact.

The tread 19 is molded to a transverse curvature considerably less than the curvature which would be imparted to the tread portion of the carcass by inflation pressure and in order to resist the expansive thrust of internal air pressure and prevent a substantial increase in the diameter of the tire on inflation, the fabric 20 is composed of cords which extend circumferentially of the tread and which hold the tread against expansion when subjected to the expansive thrust of air under pressure within the tire. The fabric 20 preferably extends into the flanges 21 to provide additional resistance to expansion of the tread and flange by internal air pressure.

In order to avoid damage to the fabric of the tire carcass due to stresses in the fabric caused by the collapsing of the tire under impact, the fabric forming the tire carcass is preferably composed of radial reinforcing cords which are disposed substantially at right angles to the circumferential cords of the fabric 20 and which because of their radial arrangement are not subjected to severe tensional stresses due to impact thrusts on the tire.

The base of the tire may be closed by fabric plies 23 which extend across the space between the tire beads, the inner layer of fabric having edge portions 24 that overlie the outer sides of the beads and the portion of the flange 21 that engages with the shoulder 4. An inner tube 25 may be vulcanized to the interior of the tire carcass and a suitable valve stem 26 may be provided for inflating the tire.

When the tire is subjected to impact, the tread is first flattened as shown in Fig. 3 and the force of impact is then transmitted through the thick tread flanges 21 to the wide shoulders 2 of the tail wheel. The thick tread flanges 21 serve to prevent excessive distortion of the tire carcass, provide a cushion between the wheel and deck surface and prevent pinching of the fabric carcass between the rim flange and the deck.

It is to be understood that variations and modifications of the specific devices herein shown and described for purposes of illustration, may be made without departing from the spirit of the invention.

What I claim is:

1. A pneumatic tire for airplane tail wheels comprising a carcass having bead rings and superposed plies of cord fabric with edge portions wrapped about said bead rings and providing thickened carcass side wall portions outwardly of the bead rings and a flexible tread portion connecting said side wall portions, said fabric having the cords thereof disposed radially, and a cord reinforced tread having an internal transverse curvature less than that of the side walls of the tire when inflated, and terminating at its opposite edges in impact cushioning flanges that overlie and project laterally from the thickened side wall portions of the tire carcass, the reinforcing cords in said tread extending circumferentially thereof to resist expansion of the tread under inflation pressure.

2. A pneumatic tire for airplane tail wheels comprising a carcass having bead rings, superposed plies of fabric with edge portions wrapped about said bead rings and providing thickened carcass side wall portions, a flexible tread portion connecting said thickened side wall portions and a base portion comprising superposed plies of fabric extending across the space between the beads, an inner layer of rubber covering the interior of the carcass, and a tread terminating at its opposite edges in impact cushioning flanges that overlie the thickened side wall portions of the carcass and project laterally therefrom, said tread having an internal transverse curvature less than the side wall portions upon inflation and being provided with cord fabric reinforcement disposed with the cords thereof extending circumferentially.

3. A pneumatic tire for airplane tail wheels comprising a carcass having bead rings and superposed plies of fabric with edge portions wrapped about said bead rings and providing thickened carcass side wall portions, a flexible tread portion connecting said side wall portions, a base portion comprising superposed plies of fabric extending across the space between the beads, an inner layer of rubber covering the interior of the carcass, and a tread terminating at its opposite edges in impact cushioning flanges that overlie the thickened side wall portions of the carcass and project laterally therefrom, said tread portion having an internal transverse curvature less than the side wall portions upon inflation and being provided with cord fabric reinforcement disposed with the cords thereof extending circumferentially, said fabric reinforcement comprising superposed plies of fabric having edge portions within said impact cushioning flanges.

HERMAN T. KRAFT.

REFERENCES CITED

The following references are of record in the file of this patent:

UNITED STATES PATENTS

| Number | Name | Date |
|---|---|---|
| 853,299 | Ebner | May 14, 1907 |
| 1,188,062 | Gammeter | June 20, 1916 |
| 1,272,664 | Hummel | July 16, 1918 |
| 1,584,284 | Grabau | May 11, 1926 |

FOREIGN PATENTS

| Number | Country | Date |
|---|---|---|
| 319,007 | Great Britain | 1928 |